Jan. 26, 1932.  L. L. GAGNON  1,842,377
OPHTHALMIC MOUNTING
Filed March 1, 1930
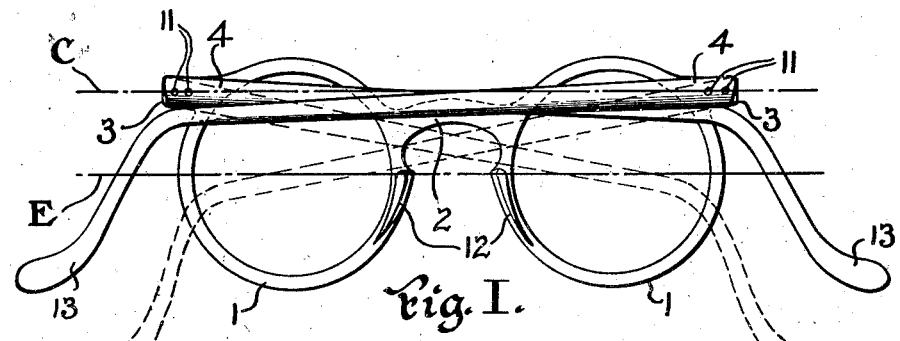
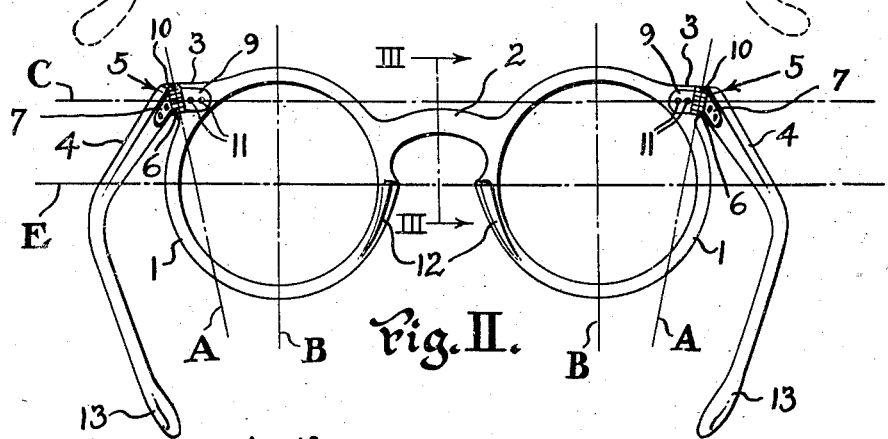
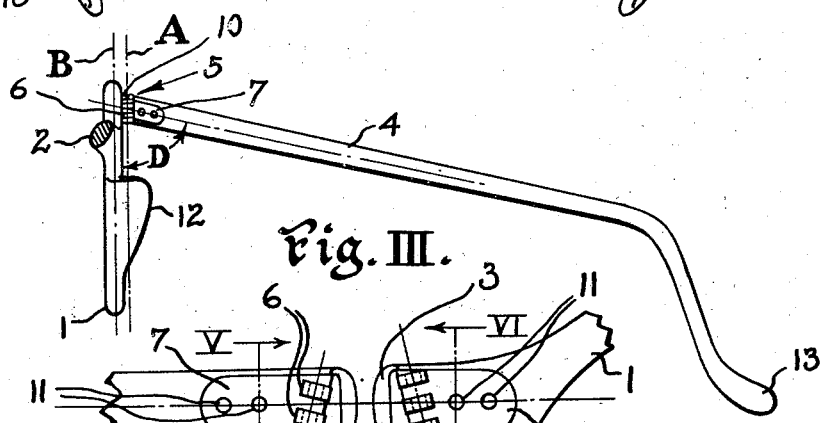
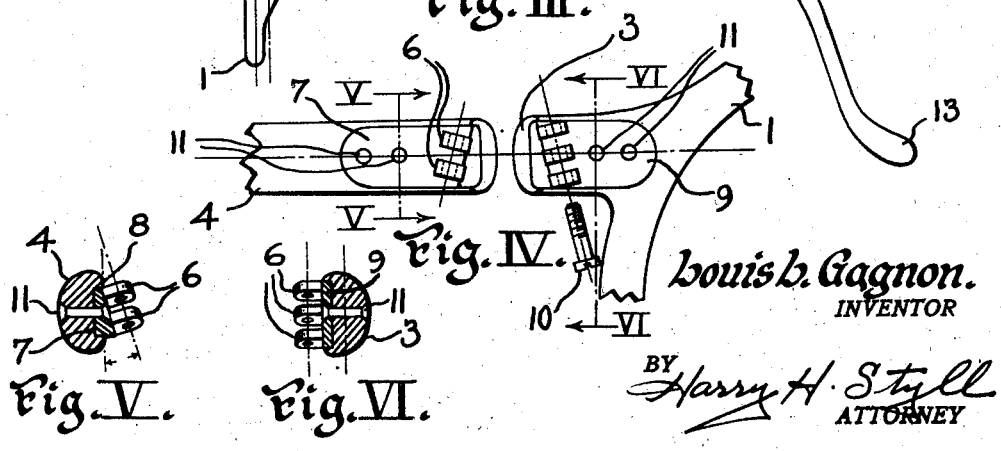
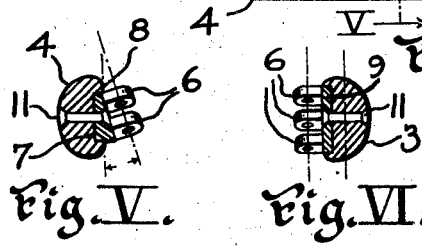
Louis L. Gagnon.
INVENTOR
BY Harry H. Styll
ATTORNEY Patented Jan. 26, 1932

1,842,377

UNITED STATES PATENT OFFICE

LOUIS L. GAGNON, OF SOUTHBRIDGE, MASSACHUSETTS, ASSIGNOR TO AMERICAN OPTICAL COMPANY, OF SOUTHBRIDGE, MASSACHUSETTS, A VOLUNTARY ASSOCIATION OF MASSACHUSETTS

OPHTHALMIC MOUNTING

Application filed March 1, 1930. Serial No. 432,444.

This invention relates to improvements in ophthalmic mountings and has particular reference to improved means of uniting the parts thereof.

The principal object of the invention is to provide improved means of uniting the parts of an ophthalmic mounting wherein the said mounting may be folded to a compact shape when not in use to permit its insertion in a relatively small spectacle case.

Another object of the invention is to provide an improved hinge construction for securing the temple or frame supports to the front of an ophthalmic mounting.

Another object is to remove the temples or head engaging members of an ophthalmic mounting from the useful field of vision and permit them to be folded in close relation to a horizontal line passing through the temple attachments.

Another object of the invention is to angle the axis of the temple hinge with respect to the vertical center line of the lens to cause the temples to assume a compact relation with the lens frames when folded thereon and to drop to a definite angular relation to the plane of the lens rims when opened for use.

Another object of the invention is to provide simple, efficient and inexpensive means of connecting the parts of an ophthalmic mounting wherein the said parts will be in their most accurate related positions when the mounting is opened or closed.

Other objects and advantages of the invention will become apparent from the following description taken in connection with the accompanying drawings and it will be apparent that many changes may be made in the details of construction and arrangement of parts without departing from the spirit of the invention as expressed in the accompanying claim. I, therefore, do not wish to be limited to the exact details shown and described as the preferred form only has been shown by way of illustration.

Referring to the drawings:

Fig. I is a rear elevation of the ophthalmic mounting embodying the invention showing the temples in closed position;

Fig. II is a view similar to Fig. I showing the temples in open position;

Fig. III is a section on line III—III of Fig. II looking in the direction indicated by the arrows;

Fig. IV is a fragmentary enlarged view of the temple hinge connection showing the parts disunited;

Fig. V is a section on line V—V of Fig. IV;

Fig. VI is a section on line VI—VI of Fig. IV.

In the usual spectacle type of ophthalmic mounting the temples or supports for holding the mounting on the face of the wearer were attached to the mounting at a point coincident with the point at which a horizontal plane passing through the pupils of the eyes of the wearer cuts the outer edge of said mounting. In this method of construction the temples are on the same horizontal plane as the pupils of the eyes of the wearer, with the result that should the wearer endeavor to obtain vision of an object on either side without first turning his head so as to obtain a direct line of vision of said object, his vision is impaired by the temple. To obviate this defect and to provide clear side vision to the wearer the temples are attached to the mounting at a point above the plane of the pupils of the eyes of the wearer, with the result that when the mounting is on the face of the wearer the temples will be out of the useful field of vision. To maintain the proper angular relation of the lenses to the eyes of the wearer with this high point of attachment and to cause the temples to fit properly over the ears of the wearer the temples must be projected downwardly from their points of attachment on an acute angle to the plane of the lenses. This angle is such that in the past, when the temples were folded, the ear-engaging or skull-engaging portions of the temple would extend below the lens rims and form a bulky mounting, particularly in the "all-shell" type. This bulkiness requires the use of an exceptionally large spectacle case and is very undesirable and inconvenient to carry about.

It, therefore, is one of the primary objects of the present invention to provide an ophthalmic mounting of the above described character that shall be foldable into a more compact shape, making it possible to use a small spectacle case without straining or distorting the parts of the mounting.

Referring to the drawings wherein similar characters of reference denote corresponding parts throughout, the device embodying the invention comprises a pair of lens rims 1 connected centrally by a bridge member 2 and provided outwardly with the usual temple attaching lugs 3 which in this instance are placed above the horizontal center line E of the lens rims 1. Suitable temples 4 are secured to the lugs 3 by means of the hinges 5 to permit the temples to be folded when the mounting is not in use. The essence of the invention lies in the details of construction of the hinge member 5 which in this instance is provided with hinge ears 6 pivoted on an axial line A, shown in Fig. II as being at an angle to the vertical center line B of the lens rims 1, and in Fig. III as being parallel to said line B. The angling of the hinge pivot causes the temples 4 to fold to a position substantially parallel to a horizontal line C, shown in Fig. I, and prevents drooping of the temples as indicated by the dotted lines. When opened for use, as shown in Fig. III, the temples 4 assume an acute angular relation D with the plane of the lens rims 1 to properly fit the face of the wearer and to cause the lenses to tilt to their true angular relation to the eyes of the wearer.

The ears 6 of the temple portion of the hinge 5 are formed in one plane on an oblique angle to the longitudinal axis of the body portion or plate 7 as shown in Fig. IV, and are angled with respect to the inner face 8 of the temple in the other plane, as shown in Fig. V. The latter angling may be accomplished by making the body portion or plate 7 wedge-shape as shown, or by making the seat for the hinge plate on the inner face of the temple on an angle. The ears 6 of the frame portion of the hinge are obliquely angled with respect to the longitudinal axis of the body portion or hinge plate 9 in one plane, as shown in Figs. II and IV and are substantially parallel to the plane of the eye side of the lens rims 1 in the other plane. The angle of the ears of the temple portion of the hinge and the ears of the frame portion of the hinge is such that the temples will assume a substantially parallel position with respect to the horizontal line C passing through the attaching lugs 3 when the temples are in closed position as shown in Fig. I and drop to an acute angle with respect to the plane of the lens rims when opened as shown in Fig. III. A screw or like means 10 is employed to unite the parts of the mounting and also serves as a pivot pin for the hinge members. The hinge members 7 and 9 are secured to the temples and lug members 3 by the rivets or the like 11.

The lens rims 1 are provided with suitable guard projections 12 which are adapted to engage the nose to support the mounting on the face of the wearer.

The temples 4 may be provided with a skull-engaging member 13 as shown or may, if desired, be formed with the usual ear-engaging hooks.

From the foregoing description it will be seen that I have provided simple, efficient and economical means wherein the mounting may be folded to compact shape when not in use to permit insertion in a small spectacle case without straining or distorting the various parts of the mounting.

Having described my invention, I claim:

In a spectacle frame, lens holding means having a lens seat therein, a bridge connecting the lens holding means on their nasal sides, temple endpieces on the temple sides of the lens holding means, temples pivotally connected to the endpieces, said pivotal connections comprising interengaging hinge members on the temples and endpieces, said hinge members having aligned openings, the contacting faces of the hinge members being obliquely disposed in the lens plane of the lens seats, the axis of the aligned opening being normal to the contacting faces, and parallel to the lens plane of the lens seats and said axis being oblique to the temples in the lens plane of said lens seats, the angle of the contacting faces of the interengaging members being disposed to fold the temples against the spectacle in a line substantially parallel to the horizontal meridian of the lens seats when closed, and obliquely to the lens plane of the lens seats when open, with the ear ends of the temples lower than the connected ends when the temples are in open position, and pivotal means through the aligned openings of the interengaging members.

LOUIS L. GAGNON.